Patented Mar. 4, 1930

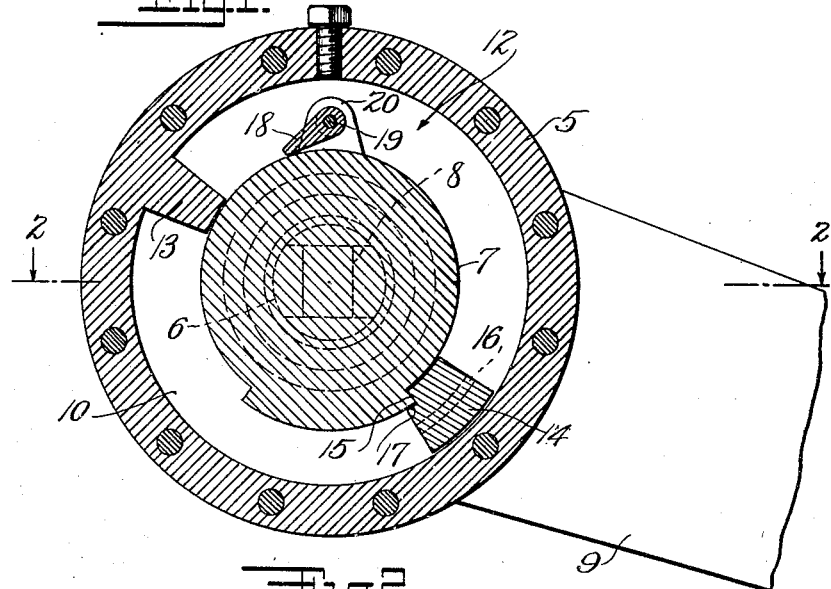
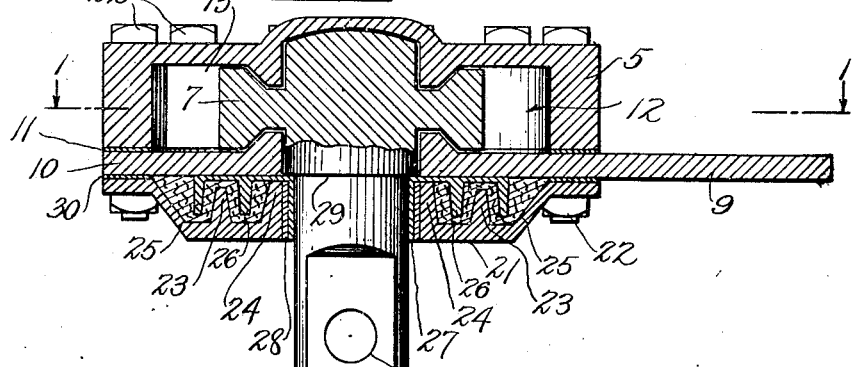
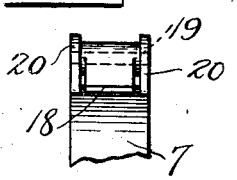
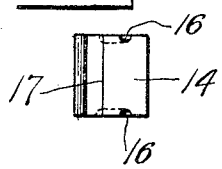

1,749,590

UNITED STATES PATENT OFFICE

MARIUS C. KRARUP, OF NEW YORK, N. Y.

SHOCK ABSORBER

Application filed November 15, 1919. Serial No. 338,212.

My present invention relates to shock absorbers, or more properly speaking, rebound checks of the general type disclosed in my Patent 1,258,021, dated March 5, 1918, for Rebound checks, and Patent 1,326,600, dated December 30, 1919, for Spring regulator.

The objects of the invention are to improve and simplify devices of this character and to secure a more effective checking operation.

In devices of the type referred to, a viscous fluid, such as oil or glycerine is usually employed for controlling the rebound action. A special object of this invention is to prevent leakage of this checking fluid.

The invention resides in certain novel features of construction, combination and relation of parts all of which will appear from the following specification taken in conjunction with the accompanying drawing wherein I have illustrated the invention embodied in one of its practical forms, it being understood that changes may be made therefrom without departure from the scope of protection afforded by the appended claims.

In the drawing referred to, Figure 1 is a vertical sectional view of the device as taken on substantially the plane of line 1—1 of Figure 2.

Figure 2 is a horizontal sectional view of the device as on substantially the plane of line 2—2 of Figure 1.

Figure 3 is a broken detail view of the hub element and the check valve carried thereby.

Figure 4 is a detail view of the loose checking piston.

The relatively movable elements of the device disclosed are designated 5 and 6, the first consisting of a casing and the second of a shaft having a hub portion 7 working within the casing. These two elements are adapted to be connected with two resiliently connected members whose joint action is to be controlled, such for instance, as the spring supported body and the axle of a vehicle. In the illustration the shaft is the element which is connected with the vehicle body, it being shown as having a flattened portion provided with bolt holes 8 by which it may be secured to the body or chassis and the casing is shown provided with a lever 9 which is shackled to the axle.

In the illustration, the lever 9 is enlarged at the casing to form a cover plate 10 for the open side of the casing and a gasket 11 is shown as interposed between the wall of the casing and the cover plate to provide a tight joint at this point.

Within the casing there is formed a substantially circular or annular passage or channel 12. In the case illustrated this passage is provided between opposed substantially cylindrical walls on the inner side of the casing and on the periphery of the hub. This passage is filled with a viscous fluid such as glycerine and one of the relatively movable parts, the casing in this instance, carries a piston 13 for impelling the fluid through this passage. Also working within the annular passage is what I have termed a loose piston 14 which travels freely in one direction under the impulse of the fluid and is arrested in its movement in the opposite direction by a shoulder 15 on the hub.

This loose checking piston is formed with a passage or passages 16 to permit a restricted flow of the oil or glycerine past the same, when it is brought up against the top shoulder.

To prevent pounding of the loose piston against its stop shoulder, I have shown the stop shoulder 15 and the surface of the piston which engages therewith as disposed substantially at a right angle to the direction of piston movement and have shown the piston as provided with a recess 17 opposite the stop shoulder. This construction results in the trapping of a small amount of the fluid between the abutting faces of the piston and stop, which fluid escapes past the dependent shoulder 17 so as to permit the piston to come to rest without jar or pound.

An additional checking effect is accomplished by means of a one-way check valve in the form of a flap 18 pivoted at 19 in the upstanding posts 20 carried by the hub.

From the construction thus far described, it will be apparent that an upward movement on the lever 9 will rock the piston 13 downwardly, causing the liquid impelled by said piston to lift the loose piston from its seat and to force the liquid past the check valve. The movement in this direction need be only slightly retarded. In the reverse direction, however, movement of the parts is retarded by reason of the checking of the fluid by the check valve. As thus retarded the piston 13 and the loose piston 14 will return to their initial positions, but as soon as the movement of the loose piston is arrested by its engagement with shoulder 15, further movement of piston 13 in the return direction is powerfully checked.

A difficulty which has heretofore existed in rebound checks of the liquid type has been the leakage of the liquid. This disadvantage I have overcome in the present invention by means of a novel form of packing and involving a body of permanently plastic wax-like substance confined about the shaft at the point of emergence from the casing. A special point of this packing is that it is non-miscible with the checking fluid. At the present time I find a mixture of petrolatum or ceresin wax and fine flaked graphite to be a good material for this purpose, the same being non-miscible with the glycerine, remaining permanently soft and plastic, providing sufficient lubricating qualities to allow free and unrestricted movement of the parts and being incompressible and therefore not displaceable by the checking fluid.

The means for confining this packing consists in the present illustration of a hollow packing plate 21 secured to the back of the casing as by means of the bolts 22 and having flanges 23 and 24 entered in between the flanges 25 and 26 carried by the shaft, it being understood that the plastic packing material entirely fills the space beneath the packing plate, including the spaces between the overlapping flanges. The flanges which are carried by the shaft may form a part of the bearing collar 27 which is fast on the shaft as by having a driving fit thereon. The packing plate 21 is shown as provided with a bushing 28 of suitable bearing metal having a close fit with the bearing collar 27.

The shaft is shown as shouldered at 29 at the point of emergence from the casing and the collar 27 is shown as driven into engagement with such shoulder and as extended laterally in engagement with the cover plate 10 so as to fully cover the joint between the shaft and casing. If found desirable, a suitable packing ring 30 may be interposed at the joint between the cover plate 10 and the packing plate 21.

By the construction disclosed, the possibility of leakage of the checking fluid is reduced to a minimum and in addition the plastic packing provides a barrier beyond which the packing fluid cannot escape because of the interfitting flanges and because of the non-miscibility of the two substances.

The pasty packing, or mixture, containing as it does a lubricating element provides also for the constant lubrication of the parts.

In assembling, the cap plate or cup 21 is usually filled with the packing material and then applied to the back of casing over the packing flanges of the shaft. The material being incompressible, any excess material escapes as the bolts are tightened so that when the cap is fully seated, the cavity is completely filled but not under pressure. This absence of pressure obviates objectionable friction at the packing, preventing wear and heating.

What I claim is:

1. The combination with a fluid containing casing and a relatively movable hub projecting through a bearing on said casing, of a packing for said hub comprising a body of plastic wax-like substance non-miscible with the fluid within the casing, and means for confining said plastic body about the hub, said confining means embodying concentric annular flanges spaced from the bearing and from one another disposed in overlapping relative positions, said flanges being carried by the casing and the hub respectively and one of said flanges being movable within the body of plastic material without displacing said material.

2. In a rebound check, a casing, a cover plate closing one side of the casing, a shaft projecting through said plate and having a hub working within the casing, a collar on said shaft provided with an annular flange, a packing plate secured to the casing over the shaft and provided with a flange overlapping the flange on the collar and a permanently plastic body of a wax-like substance confined between said packing plate and the cover plate and engaged between the overlapping flanges.

3. In a rebound check, a casing, a shaft projecting from said casing, a collar fast on said shaft having a portion bearing against the side wall of the casing, and an annular flange projecting from said portion, a packing plate applied to the casing over said collar having a bearing on the collar and a flange overlapping the flange of the collar and a body of a plastic wax-like substance confined by said plate against the back of the casing and engaged between the overlapping flanges.

4. A structure containing a fluid and comprising relatively rotatable parts having bearing surfaces between them, a cup tightly secured to one of said parts and having a surface bearing upon the other part spaced from said first named bearing surfaces, and a permanently plastic wax-like substance non-miscible with said fluid, in the cup and in the space between the first and second named bearing surfaces.

5. A structure containing a fluid and comprising relatively rotatable parts having bearing surfaces between them, a cup tightly secured to one of said parts and having a surface bearing upon the other part spaced from said first named bearing surfaces, a permanently plastic wax-like substance non-miscible with said fluid, in the cup and in the space between the first and second named bearing surfaces, and oppositely disposed baffles within said cup extending from the cup and from a relatively movable part and disposed to be movable in the plastic substance without disturbing said substance.

In witness whereof, I have hereunto set my hand this 13th day of November, 1919.

MARIUS C. KRARUP.